US012663593B2

(12) United States Patent
Dasgupta et al.

(10) Patent No.: US 12,663,593 B2
(45) Date of Patent: Jun. 23, 2026

(54) STRUCTURES FOR A PHOTONICS CHIP THAT ENABLE EXTERNAL COMMUNICATION

(71) Applicant: GlobalFoundries U.S. Inc., Malta, NY (US)

(72) Inventors: Arpan Dasgupta, Beacon, NY (US); Kevin Dezfulian, Arlington, VA (US); Yusheng Bian, Ballston Lake, NY (US); Norman Robson, Fishkill, NY (US); Brittany Hedrick, Lagrangeville, NY (US); Thomas Houghton, Marlboro, NY (US); Kenneth J. Giewont, Hopewell Junction, NY (US); Koushik Ramachandran, Wappingers Falls, NY (US); Daniel W. Fisher, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 265 days.

(21) Appl. No.: 18/513,147

(22) Filed: Nov. 17, 2023

(65) Prior Publication Data

US 2025/0164707 A1    May 22, 2025

(51) Int. Cl.
*G02B 6/42* (2006.01)

(52) U.S. Cl.
CPC ......... *G02B 6/4206* (2013.01); *G02B 6/4214* (2013.01)

(58) Field of Classification Search
CPC ....................................................... G02B 6/42
USPC ........................................................... 385/43
See application file for complete search history.

(56) References Cited

U.S. PATENT DOCUMENTS

| | | | | |
|---|---|---|---|---|
| 7,542,641 | B1 * | 6/2009 | Asghari | G02B 6/12007 |
| | | | | 385/27 |
| 7,599,277 | B1 * | 10/2009 | Kato | G11B 7/122 |
| | | | | 369/112.09 |
| 9,726,839 | B2 * | 8/2017 | Shimura | G02B 6/4246 |
| 10,520,165 | B1 * | 12/2019 | Mao | F21V 7/30 |
| 10,591,694 | B2 * | 3/2020 | Paquet | H01S 5/18361 |
| 12,216,314 | B2 * | 2/2025 | Kobayashi | G02B 6/4214 |

(Continued)

FOREIGN PATENT DOCUMENTS

| | | | | | |
|---|---|---|---|---|---|
| JP | | 2004054224 A | * | 2/2004 | |
| JP | | 2015142055 A | * | 8/2015 | H01S 5/0267 |
| WO | | WO-2024142624 A1 | * | 7/2024 | H01S 5/183 |

OTHER PUBLICATIONS

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Kaveh C Kianni

(74) *Attorney, Agent, or Firm* — Thompson Hine LLP; Anthony Canale

(57)    ABSTRACT

Structures for a photonics chip that enable external communication and methods of forming such structures. The structure comprises a spot-size converter, a body on a semiconductor substrate, and a dielectric layer on the semiconductor substrate. The body includes a surface adjacent to the spot-size converter and a reflector on the surface. The dielectric layer includes a recess disposed above the spot-size converter and the reflector.

20 Claims, 3 Drawing Sheets

(56)                    References Cited

U.S. PATENT DOCUMENTS

| | | | |
|---|---|---|---|
| 2002/0036753 A1* | 3/2002 | Kasama | B82Y 35/00 |
| | | | 353/31 |
| 2004/0113550 A1* | 6/2004 | Adachi | H05B 33/22 |
| | | | 313/512 |
| 2011/0064354 A1* | 3/2011 | Nishio | G02B 6/4214 |
| | | | 264/1.25 |
| 2019/0033542 A1* | 1/2019 | Epitaux | G02B 6/4226 |
| 2020/0363594 A1* | 11/2020 | Lu | G02B 6/30 |
| 2021/0356519 A1* | 11/2021 | Soldano | G01M 11/35 |
| 2022/0382004 A1* | 12/2022 | Weng | G02B 6/12004 |
| 2023/0026756 A1* | 1/2023 | Saito | G02B 5/0858 |
| 2023/0084003 A1* | 3/2023 | Taha | G02B 6/4214 |
| | | | 385/31 |
| 2023/0185118 A1* | 6/2023 | Nomura | G02F 1/292 |
| | | | 359/247 |
| 2023/0333334 A1* | 10/2023 | Saito | G02B 6/4214 |
| 2024/0004148 A1* | 1/2024 | Soldano | G02B 6/4245 |
| 2024/0427081 A1* | 12/2024 | Weng | G02B 6/136 |

OTHER PUBLICATIONS

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.
B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.
Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.
Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.
A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.
A. Noriki et al., "Mirror-Based Broadband Silicon-Photonics Vertical I/O With Coupling Efficiency Enhancement for Standard Single-Mode Fiber," in Journal of Lightwave Technology, vol. 38, No. 12, pp. 3147-3155, 15 Jun. 15, 2020, doi: 10.1109/JLT.2020.2995915.
Letavic, Theodore et al., "Photonic Structures Including Multiple Input/Output Optical Couplers" filed Sep. 8, 2023 as a U.S. Appl. No. 18/243,701.

* cited by examiner

STRUCTURES FOR A PHOTONICS CHIP THAT ENABLE EXTERNAL COMMUNICATION

BACKGROUND

This disclosure relates to photonics chips and, more specifically, to structures for a photonics chip that enable external communication and methods of forming such structures.

Photonics chips are used in many different types of applications and systems, such as data communication systems and data computation systems. A photonics chip includes a photonic integrated circuit comprised of photonic components, such as modulators, polarizers, and optical couplers, that are used to manipulate light received from a light source, such as an optical fiber or a laser. The light source may be coupled by an edge coupler, also referred to as a spot-size converter, to the photonic integrated circuit on the photonics chip. The edge coupler is configured to transfer light of a given mode from the light source to the photonic integrated circuit.

Improved structures for a photonics chip that enable external communication and methods of forming such structures are needed.

SUMMARY

In an embodiment of the invention, a structure for a photonics chip is provided. The structure comprises a spot-size converter, a body on a semiconductor substrate, and a dielectric layer on the semiconductor substrate. The body includes a surface adjacent to the spot-size converter and a reflector on the surface. The dielectric layer includes a recess disposed above the spot-size converter and the reflector.

In an embodiment of the invention, a method of forming a structure for a photonics chip is provided. The method comprises forming a body on a semiconductor substrate, and forming a dielectric layer on the semiconductor substrate. The body includes a surface adjacent to a spot-size converter and a reflector on the surface. The method further comprises forming a recess in the dielectric layer that is disposed above the spot-size converter and the reflector.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
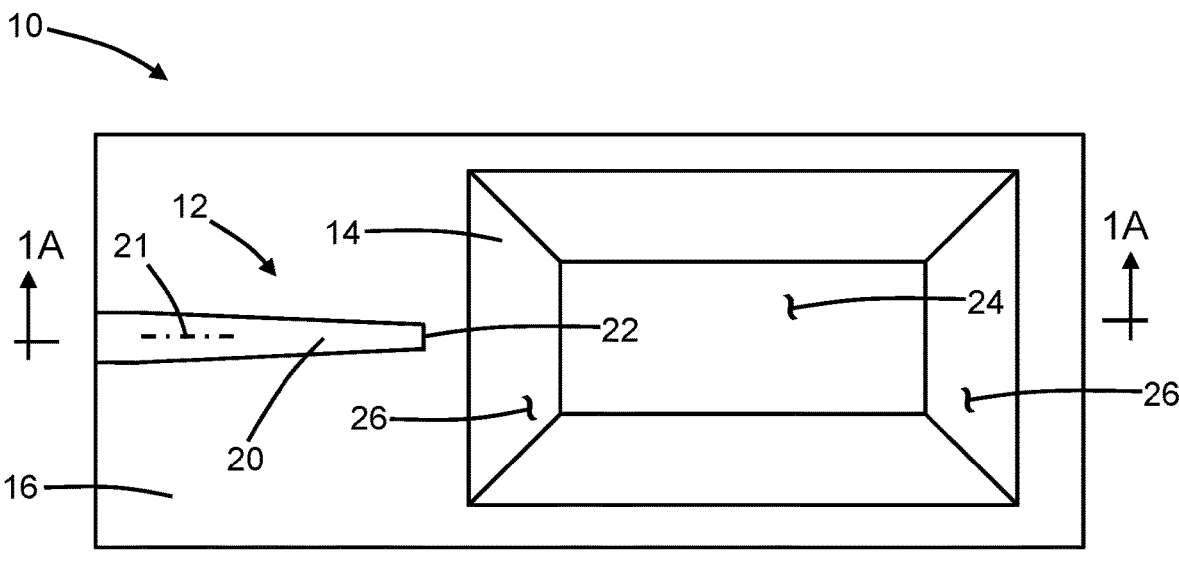
FIG. 1 is a top view of a structure at an initial fabrication stage of a processing method in accordance with embodiments of the invention.
Figure 1A:
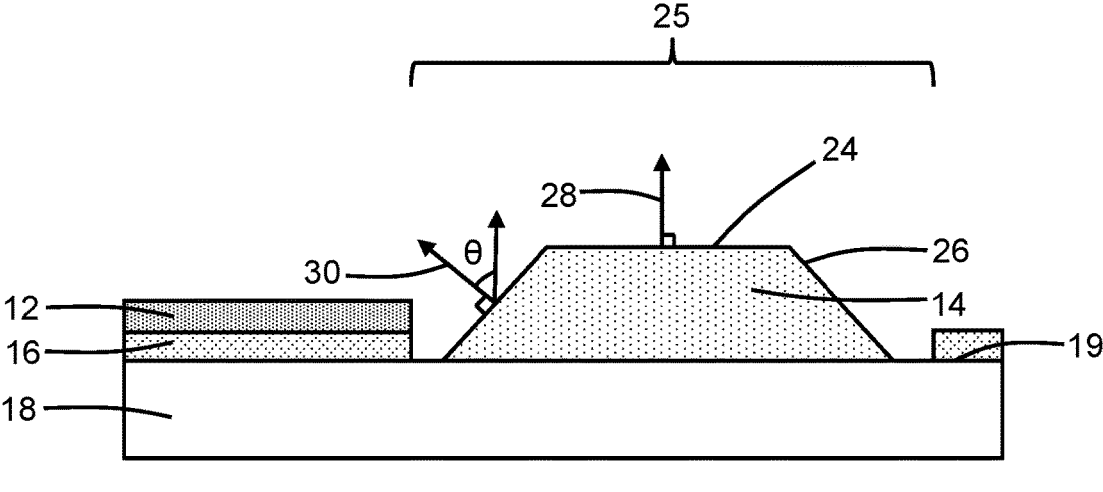
FIG. 1A is a cross-sectional view taken generally along line 1A-1A in FIG. 1.

With reference to FIGS. 1, 1A and in accordance with embodiments of the invention, a structure 10 for a photonics chip includes waveguide core 12 and a body 14 disposed adjacent to the waveguide core 12. The waveguide core 12 is formed on, and over, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate.

In an embodiment, the waveguide core 12 may be comprised of a material having a refractive index that is greater than the refractive index of silicon dioxide. In an embodiment, the waveguide core 12 may be comprised of a semiconductor material. In an embodiment, the waveguide core 12 may be comprised of single-crystal silicon, poly-silicon, or amorphous silicon. The waveguide core 12 may be formed by patterning a layer comprised of their constituent material with lithography and etching processes. In an embodiment, the waveguide core 12 may be formed by patterning the semiconductor material, such as single-crystal silicon, of a device layer of a silicon-on-insulator substrate. The dielectric layer 16 provides low-index cladding that separates the waveguide core 12 from the semiconductor substrate 18.

The body 14 is formed on a portion of the semiconductor substrate 18 inside an opening 25 that penetrates fully through the dielectric layer 16. In an embodiment, a portion of the dielectric layer 16 may be removed from the portion of the semiconductor substrate 18 to define the opening 25 by lithography and etching processes. In an embodiment, the device layer of a silicon-on-insulator substrate may be removed at the location of the opening 25, before the opening 25 is formed, as part of the lithography and etching processes used to pattern the device layer to form the waveguide core 12.

The waveguide core 12 includes a spot-size converter defined by a tapered section 20 that is positioned adjacent to the body 14. The tapered section 20, which extends lengthwise along a longitudinal axis 21, terminates at an end surface 22 that is spaced from the body 14. The tapered section 20 may have a width dimension that increases with increasing distance along the longitudinal axis 21 from the end surface 22. In an embodiment, the width dimension of the tapered section 20 may increase linearly with increasing distance from the end surface 22. In an alternative embodiment, the width dimension of the tapered section 20 may vary based on a non-linear function, such as a quadratic function, a cubic function, a parabolic function, a sine function, a cosine function, a Bezier function, or an exponential function. In an embodiment, the tapered section 20 may include a single stage of tapering characterized by a taper angle. In an alternative embodiment, the tapered section 20 may taper in multiple stages each characterized by a different taper angle.

In an alternative embodiment, the spot-size converter embodied in the waveguide core 12 may have a different configuration. For example, the waveguide core 12 may be divided into segments of a subwavelength grating that are arranged in a spaced relationship along the longitudinal axis 21.

The body 14 defines a raised structure in the form of a three-dimensional mound or mesa having a top surface 24 and faceted surfaces 26 that fully surround the top surface 24. The body 14 may be comprised of a single-crystal semiconductor material, such as single-crystal silicon, that is epitaxially grown from the surface area of the exposed portion of the semiconductor substrate 18 inside the opening 25. The body 14 grows upwardly from a top surface 19 of the semiconductor substrate 18 and may project in elevation above the level of the waveguide core 12 and dielectric layer 16. In that regard, the body 14 may have an upper portion that is disposed above the waveguide core 12 and a lower portion that is disposed below the waveguide core 12. In an embodiment, the faceted surfaces 26 may be planar.

The faceted surfaces 26 have an inclined or tilted orientation relative to the top surface 24. In an embodiment, the single-crystal semiconductor material of the body 14 may be characterized by multiple crystalline orientations arising from differential etch rates during a post-growth etching process that is crystal-direction dependent. The top surface 24 has a surface normal 28 that is aligned perpendicular to the top surface 24, and each faceted surface 26 has a surface normal 30 that is aligned perpendicular to the faceted surface 26. The surface normal 30 of each faceted surface 26 is inclined at an angle θ relative to the surface normal 28 of the top surface 24. In an embodiment, the surface normal 30 of each faceted surface 26 may be aligned in a <111> crystallographic direction of the crystal lattice structure of the single-crystal semiconductor material of the body 14, and the surface normal 28 of the top surface 24 may be aligned in a <100> crystallographic direction of the crystal lattice structure of the single-crystal semiconductor material of the body 14. In an embodiment, the surface normal 30 of each faceted surface 26 may be inclined at an angle θ of 54.7 degrees relative to the surface normal 28 of the top surface 24.

Figures 2, 3:
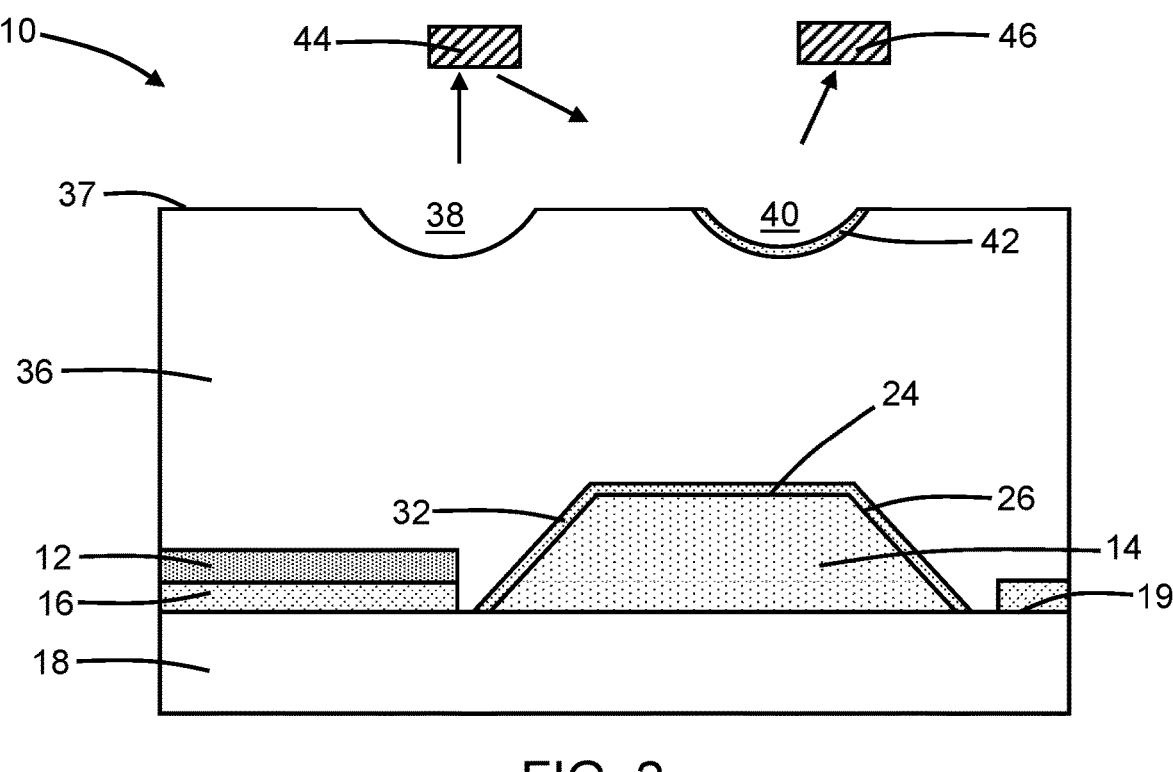
FIG. 2 is a cross-sectional view of the structure at a fabrication stage of the processing method subsequent to FIGS. 1, 1A.
FIG. 3 is a cross-sectional view of a structure in accordance with alternative embodiments of the invention.

With reference to FIG. 2 in which like reference numerals refer to like features in FIGS. 1, 1A and at a subsequent fabrication stage, a layer 32 may be formed as a mirror or reflector on the body 14. In an embodiment, the layer 32 may be formed by, for example, a conformal deposition or plating process as a coating that covers the top surface 24 and faceted surfaces 26 of the body 14. In an embodiment, the layer 32 may be characterized by a uniform thickness of material. In an embodiment, the layer 32 may be comprised of a material that is capable of reflecting light with a given wavelength, such as light with an infrared wavelength. In an embodiment, the layer 32 may be comprised of a metal, such as gold, silver, or a combination of these or other metals. The portions of the layer 32 on the different faceted surfaces 26 of the body 14 are inclined relative to the longitudinal axis 21 of the waveguide core 12 at the same angle θ as the faceted surfaces 26.

The longitudinal axis 21 of the waveguide core 12 is aligned to intersect the layer 32 on a portion of an adjacent one of the faceted surfaces 26 of the body 14. As a result, the surface normal 30 of the adjacent faceted surface 26 and the coincident surface normal of the layer 32 on the adjacent faceted surface 26 are both inclined at the angle relative to the longitudinal axis 21 of the waveguide core 12. In an embodiment, the surface normal 30 of the adjacent faceted surface 26 and the coincident surface normal of the layer 32 on the faceted surface 26 may be inclined at 35.3 degrees relative to the longitudinal axis 21 of the waveguide core 12.

A dielectric layer 36 may be formed over the waveguide core 12 and the body 14 that is coated by the layer 32. The dielectric layer 36 may be comprised of a dielectric material, such as silicon dioxide, having a refractive index that is less than the refractive index of the material constituting the waveguide core 12. The dielectric layer 36 may be deposited and then planarized following deposition. A portion of the dielectric layer 36 fills the gap between the waveguide core 12 and the layer 32 on the adjacent faceted surface 26 of the body 14 with dielectric material. The dielectric layer 16 is disposed between the dielectric layer 36 and the semiconductor substrate 18.

Recesses 38, 40 are formed as dished concavities in a top surface 37 of the dielectric layer 36. The recesses 38, 40 are recessed relative to the top surface 37 of the dielectric layer 36, which is opposite from a bottom surface generally at the elevation of the waveguide core 12. The recesses 38, 40 extend from the top surface 37 of the dielectric layer 36 into the dielectric layer 36 and partially through the dielectric layer 36. The recesses 38, 40 may be formed by lithography and etching processes using grayscale lithography in which the thickness of a photoresist layer applied on the top surface 37, before performing the etching process, is modulated.

In an embodiment, light emitted from the tapered section 20 of the waveguide core 12 may be reflected by the layer 32 on the adjacent faceted surface 26 toward the recess 38. The recess 38 is disposed above the layer 32 on the faceted surface 26 adjacent to the end surface 22 of the waveguide core 12 and above the tapered section 20 of the waveguide core 12 participating in the spot-size converter. The recess 38 is positioned to receive light reflected from the layer 32. The recess 40 is also disposed above the portion of the layer 32 on the faceted surface 26 adjacent to the end surface 22 of the waveguide core 12 and above the tapered section 20 of the waveguide core 12 participating in the spot-size converter. The recess 40 is laterally spaced along the top surface 37 of the dielectric layer 36 from the recess 38 such that the recess 38 is closer to the portion of the layer 32 on the faceted surface 26 adjacent to the end surface 22 of the waveguide core 12 than the recess 40.

A layer 42 may be formed as a mirror or reflector on the surface of the dielectric layer 36 bordering the recess 40 to define a mirrored lens. In an embodiment, the layer 42 may be formed by a conformal deposition or plating process as a coating that covers the contour defined by the recess 40 with a uniform thickness of material. In an embodiment, the layer 42 may be comprised of a material capable of reflecting light with a given wavelength, such as an infrared wavelength. In an embodiment, the layer 42 may be comprised of a metal, such as gold, silver, or a combination of these materials.

The recesses 38, 40 may be shaped to define lenses that are configured to either expand or focus a light beam. In an embodiment, the recess 38 may be shaped to define a lens configured to expand a refracted light beam, and the recess 40 may be shaped to define a lens configured to focus a reflected light beam. The recesses 38, 40 may cooperate with the reflector defined by the layer 32 to enable external communication between an off-chip element 46, such as an optical fiber, and a photonic integrated circuit on the photonics chip that includes the spot-size converter.

In use, light propagating in the waveguide core 12 may be emitted from the tapered section 20 toward the layer 32 on the faceted surface 26 that is adjacent to the end surface 22 of the tapered section 20. The layer 32 acts as a reflector for the incident light received from the spot-size converter. In particular, the layer 32 reflects the incident light out of the horizontal plane toward the recess 38 in the dielectric layer 36. The recess 38 acts as a lens that expands and directs the light toward an off-chip reflector 44. The off-chip path of the light is generally indicated by the single-headed arrows. The off-chip reflector 44 reflects the light toward the recess 40 in the dielectric layer 36. The recess 40 and the layer 42 on the surface of the recess 40 may act as a combination of a lens and a mirror that focuses and reflects the incident light toward the off-chip element 46, which may include an optical fiber. Alternatively, the light path may be reversed such that light originates from the off-chip element 46 and is directed to the spot-size converter.

The structure 10 may enable an optical input/output interface for a photonics chip that, when replicated, is characterized by an increased optical input/output count and relaxed alignment tolerances. The structure 10 may be formed by wafer-level processing, which may improve throughput compared to non-wafer-level processes. An undercut in the semiconductor substrate 18 is not required because the off-chip element 46 in communication with the spot-size converter is not located at the same elevation as the waveguide core 12. Instead, the light exiting the spot-size converter is reflected upwardly away from semiconductor substrate 18 to be coupled with the optical fiber that is positioned over the top surface 37 of the dielectric layer 36. The recesses 38, 40 providing the focusing are separated from the semiconductor substrate 18 by the majority of the thickness of the dielectric layer 36.

With reference to FIG. 3 and in accordance with alternative embodiments, the structure 10 may include a distributed Bragg reflector instead of the layer 32. The distributed Bragg reflector includes layers 50 and layers 52 that are stacked to alternate with the layers 50. Each pair of layers 50, 52 defines a period of the distributed Bragg reflector. The layers 50 and the layers 52 are characterized by different refractive indices that result in the reflection of incident light at each interlayer interface in the layer stack. In an embodiment, the layers 50 may be comprised of titanium dioxide and the layers 52 may be comprised of silicon dioxide.

Figure 4:
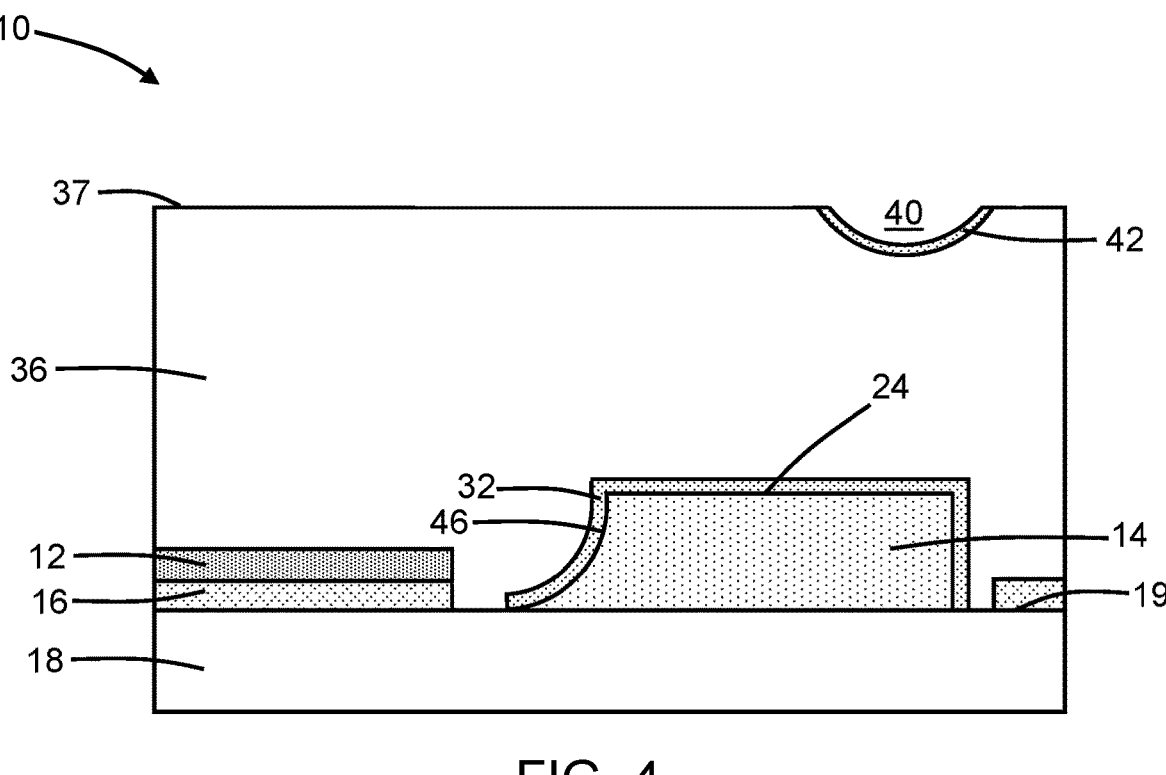
FIG. 4 is a cross-sectional view of a structure in accordance with alternative embodiments of the invention.

With reference to FIG. 4 and in accordance with alternative embodiments, the body 14 may include a curved surface 48 instead of the faceted surface 26. The end surface 22 of the waveguide core 12 is disposed adjacent to dished concavity bounded by the curved surface 48. The longitudinal axis 21 of the waveguide core 12 is aligned to intersect the layer 32 on a portion of the curved surface 48 of the body 14. In an embodiment, the body 14 may be comprised of a polycrystalline semiconductor material, such as polysilicon, or an amorphous semiconductor material, such as amorphous silicon, that is deposited and patterned by lithography and etching processes. In an alternative embodiment, the body 14 may contain a different type of material that is deposited and patterned to provide the curved surface 48. In an alternative embodiment, the layers 50 and layers 52 of the distributed Bragg reflector may be formed as a mirror or reflector on the curved surface 48 instead of the layer 32. The curved surface 48 and the layer 32 on the curved surface 48 may function as a mirrored lens that combines the functions of a reflector and a lens, which may enable the omission of the recess 38 from the structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value speci-fied. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:

a semiconductor substrate;

a spot-size converter;

a body on the semiconductor substrate, the body including a surface adjacent to the spot-size converter and a first reflector on the surface;

a first dielectric layer on the semiconductor substrate, the first dielectric layer including a first recess disposed above the spot-size converter and the first reflector; and a second dielectric layer between the first dielectric layer and the semiconductor substrate, the second dielectric layer including an opening penetrating through the second dielectric layer to a portion of the semiconductor substrate, wherein the body is disposed inside the opening on the portion of the semiconductor substrate.

2. The structure of claim 1 wherein the spot-size converter includes a waveguide core disposed on the second dielectric layer adjacent to the first reflector on the surface of the body.

3. The structure of claim 2 wherein the waveguide core includes a tapered section and an end surface that are adjacent to the first reflector on the surface of the body.

4. The structure of claim 1 wherein the spot-size converter includes a waveguide core having a longitudinal axis, and the surface of the body and the first reflector on the surface of the body are inclined relative to the longitudinal axis of the waveguide core.

5. The structure of claim 4 wherein the first reflector comprises a metal layer.

6. The structure of claim 4 wherein the first reflector is a distributed Bragg reflector including a plurality of first layers and a plurality of second layers that alternate with the first layers, the first layers comprise a first material having a first refractive index, and the second layers comprise a second material having a refractive index different from the first refractive index.

7. The structure of claim 4 wherein the body comprises a single-crystal semiconductor material having a crystal lattice structure, and the surface of the body is faceted with a surface normal aligned in a crystallographic direction of the crystal lattice structure of the single-crystal semiconductor material.

8. The structure of claim 1 wherein the first reflector comprises a metal layer.

9. The structure of claim 1 wherein the first reflector is a distributed Bragg reflector including a plurality of first layers and a plurality of second layers that alternate with the first layers, the first layers comprise a first material having a first refractive index, and the second layers comprise a second material having a refractive index different from the first refractive index.

10. The structure of claim 1 wherein the surface of the body and the first reflector are curved.

11. The structure of claim 10 wherein the first reflector comprises a metal layer, and the body comprises a polycrystalline semiconductor material or an amorphous semiconductor material.

12. The structure of claim 10 wherein the first reflector is a distributed Bragg reflector including a plurality of first layers and a plurality of second layers that alternate with the first layers, the first layers comprise a first material having a first refractive index, and the second layers comprise a second material having a refractive index different from the first refractive index.

13. A structure for a photonics chip, the structure comprising:
   a semiconductor substrate;
   a spot-size converter;
   a body on the semiconductor substrate, the body including a surface adjacent to the spot-size converter and a first reflector on the surface;

a first dielectric layer on the semiconductor substrate, the first dielectric layer including a first recess and a second recess, the first recess disposed above the spot-size converter and the first reflector, and the second recess disposed above the first reflector; and
   a second reflector inside the second recess.

14. The structure of claim 13 wherein the first reflector comprises a first metal layer, and the second reflector comprises a second metal layer.

15. The structure of claim 13 further comprising:
   a second dielectric layer between the first dielectric layer and the semiconductor substrate, the second dielectric layer including an opening penetrating through the second dielectric layer to a portion of the semiconductor substrate,
   wherein the body is disposed inside the opening on the portion of the semiconductor substrate.

16. The structure of claim 15 wherein the body comprises a single-crystal semiconductor material having a crystal lattice structure, and the surface of the body is faceted with a surface normal aligned in a crystallographic direction of the crystal lattice structure of the single-crystal semiconductor material.

17. The structure of claim 13 wherein the first dielectric layer includes a top surface, and the first recess and the second recess are recessed below the top surface of the first dielectric layer.

18. A structure for a photonics chip, the structure comprising:
   a semiconductor substrate;
   a spot-size converter;
   a body on the semiconductor substrate, the body including a surface adjacent to the spot-size converter and a first reflector on the surface;
   a first dielectric layer on the semiconductor substrate, the first dielectric layer including a recess disposed above the spot-size converter and the first reflector; and
   a second reflector inside the recess.

19. The structure of claim 18 wherein the first reflector comprises a first metal layer, and the second reflector comprises a second metal layer.

20. The structure of claim 18 further comprising:
   a second dielectric layer between the first dielectric layer and the semiconductor substrate, the second dielectric layer including an opening penetrating through the second dielectric layer to a portion of the semiconductor substrate,
   wherein the body is disposed inside the opening on the portion of the semiconductor substrate.

* * * * *